United States Patent [19]

Harter et al.

[11] Patent Number: 4,549,479
[45] Date of Patent: Oct. 29, 1985

[54] PAPAYA SCRAPING MACHINE

[75] Inventors: Elton H. Harter; Federico F. Villar, both of San Jose, Costa Rica

[73] Assignee: Gerber Products Company, Fremont, Mich.

[21] Appl. No.: 485,932

[22] Filed: Apr. 18, 1983

[51] Int. Cl.⁴ .............................................. A23N 7/00
[52] U.S. Cl. ...................................... 99/625; 99/623; 99/628
[58] Field of Search .................. 99/537–540, 99/567, 584, 623–625, 626, 629; 426/481–483

[56] References Cited

U.S. PATENT DOCUMENTS

| 2,201,514 | 5/1940 | Akau | 99/625 |
| 2,697,463 | 12/1954 | Desrosier | 99/584 X |
| 3,745,913 | 7/1973 | Hobbs | 99/625 |
| 4,242,952 | 1/1981 | van der Schoot | 99/625 |
| 4,369,698 | 1/1983 | Hemfort et al. | 99/495 X |
| 4,394,398 | 7/1983 | Wilson | 99/567 X |

OTHER PUBLICATIONS

Papaya Puree and Nectar, Brekke et al., U. of Hawaii Agricultural Experiment Station Research Bulletin 170, (1973).
Development & Performance of Equipment for Removing Papaya Flesh, Angara, Jr. et al., Trans. of the ASAF, vol. 12, pp. 745–751, (1969).

Primary Examiner—Timothy F. Simone
Attorney, Agent, or Firm—Townsend and Townsend

[57] ABSTRACT

A gravity-fed papaya skin scraping machine 10 is disclosed, comprising a rotating scraper drum 20, an inclined feed plate 60 above the drum, a conveyor belt assembly 40 above the drum to hold papaya slices 11 down on rotating rods 21 in the drum, a pulp, seed, and juice collection hopper 100 beneath the drum, and a discharge plate 80 which catches skins coming off of the drum. The pulp and seeds are subsequently separated in a finisher, free from the bitter latex taste left by prior art methods of removing the skins.

9 Claims, 3 Drawing Figures

PAPAYA SCRAPING MACHINE

BACKGROUND OF THE INVENTION

1. Field of the Invention

The present invention relates to fruit processing machinery and specifically to a papaya scraping or peeling machine.

2. Description of the Prior Art

Papaya puree was traditionally produced by chopping the whole fruit and screening the pulp out from the skin and seeds. However, that process yielded bitter tasting puree. It is preferable to peel the skin off and remove the seeds unbroken. As hand-peeling is laborious there has been a need to mechanize the process, which is difficult because the more regularly shaped papayas are sold fresh leaving irregular shapes for puree production. A papaya scraper built by Angara et al. was described in the December 1969 issue of the *Transactions of the American Society of Agricultural Engineers* at pp. 745–751. It comprised two feeder belts, a puree collection hopper, and a rotating scraper drum holding alternating round rods and wedge-shaped blades parallel to its axis. Papayas were sliced into thirds and placed face down on the first belt, which carried them to the downward-facing second belt. Friction of the second belt held the papaya skin as the flesh and seeds were scraped away by the drum and deposited in a puree collection hopper. The momentum of the skins carried them beyond the collection hopper. That machine was modified as described by Brekke et al. in *Research Bulletin* 170 of the Hawaii Agricultural Experiment Station at the University of Hawaii. The modified machine used all round rods, to reduce seed breakage, but the pulp and seeds were only loosened from the skins, and had to be separated later by a centrifuge. Because papaya skins contain bitter tasting latex, steaming or "blanching" the whole fruit before processing was necessary to coagulate the latex and prevent it from exuding from cuts in the skin while the skins were mixed with the pulp.

The supply of and demand for papaya puree have continued to increase, for example in Costa Rica, making necessary a more satisfactory peeling machine.

SUMMARY OF THE INVENTION

It is therefore an object of this invention to provide a method and apparatus for cleaning, and as rapidly as possible separating, the skin and seeds of irregularly shaped papayas from their pulp. Other objects are to provide a method in which it is not necessary to blanch the papaya first and in which the peeled skin pieces exuding latex are kept from mixing with the pulp. These objects are attained by providing a feed plate on which sliced papayas are placed face down to slide by gravity onto a rotating scraper drum. Rods forming the drum wall scrape out the papaya pulp and seeds while a conveyor belt above the rods slows movement of the skins. The pulp and seeds fall through the drum rods into a collection hopper below for removal to, and separation of seeds by, a finisher. The skins are swept by the conveyor belt onto a discharge plate.

DETAILED DESCRIPTION OF THE PREFERRED EMBODIMENT

Immature papaya has pale, hard flesh which is difficult to remove. The flesh becomes soft and yellow from the seeds outward as it ripens, which it must do before it is suitable for processing into puree. Mature fruit is washed, inspected, trimmed, and cut into halves or thirds before having the pulp scraped out by this invention.

Figure 1:
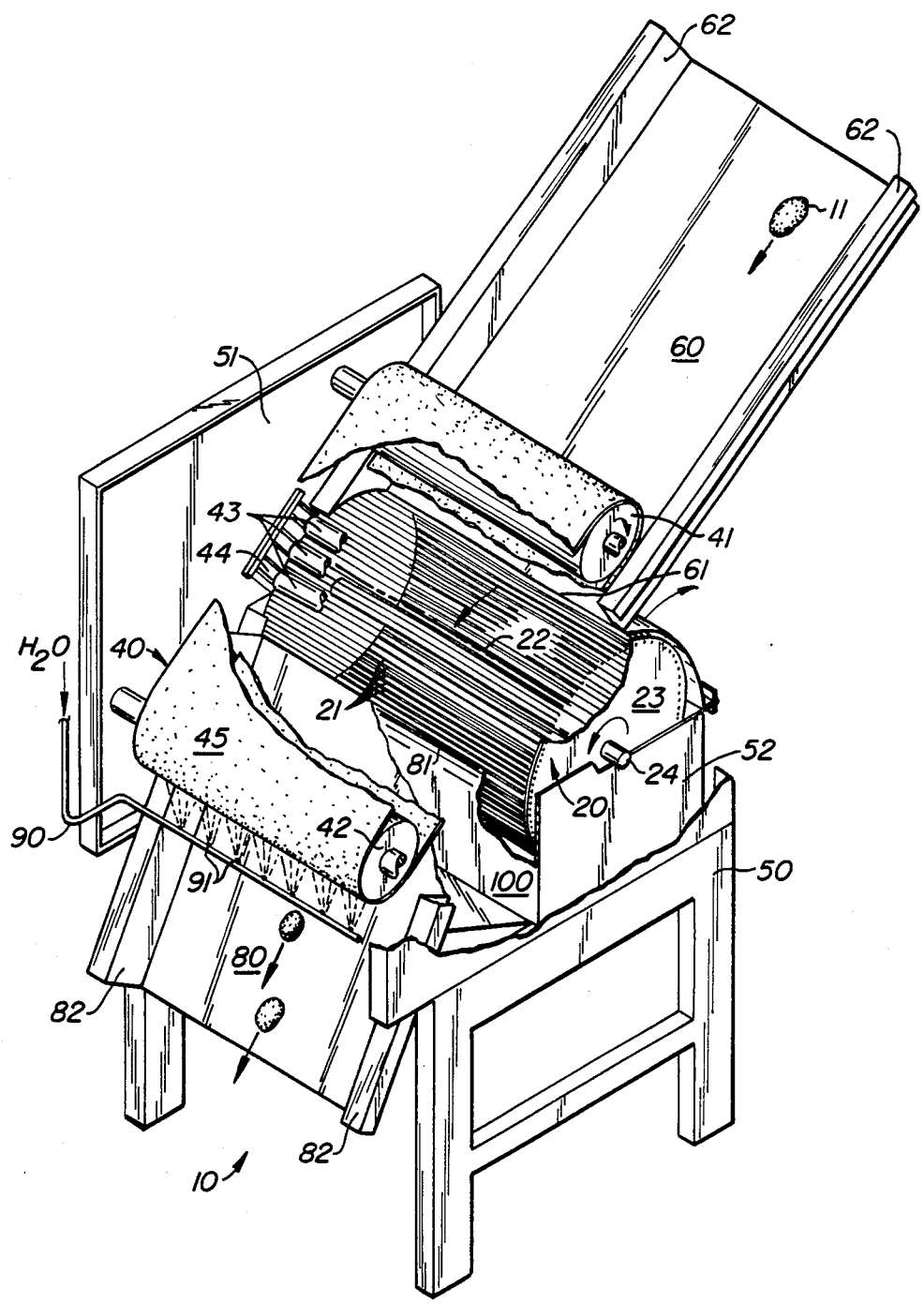
FIG. 1 is a perspective view of the papaya scraper of this invention with part of the conveyor belt and hold down bars cut away to show the rods comprising the scraper drum.
Figure 2:
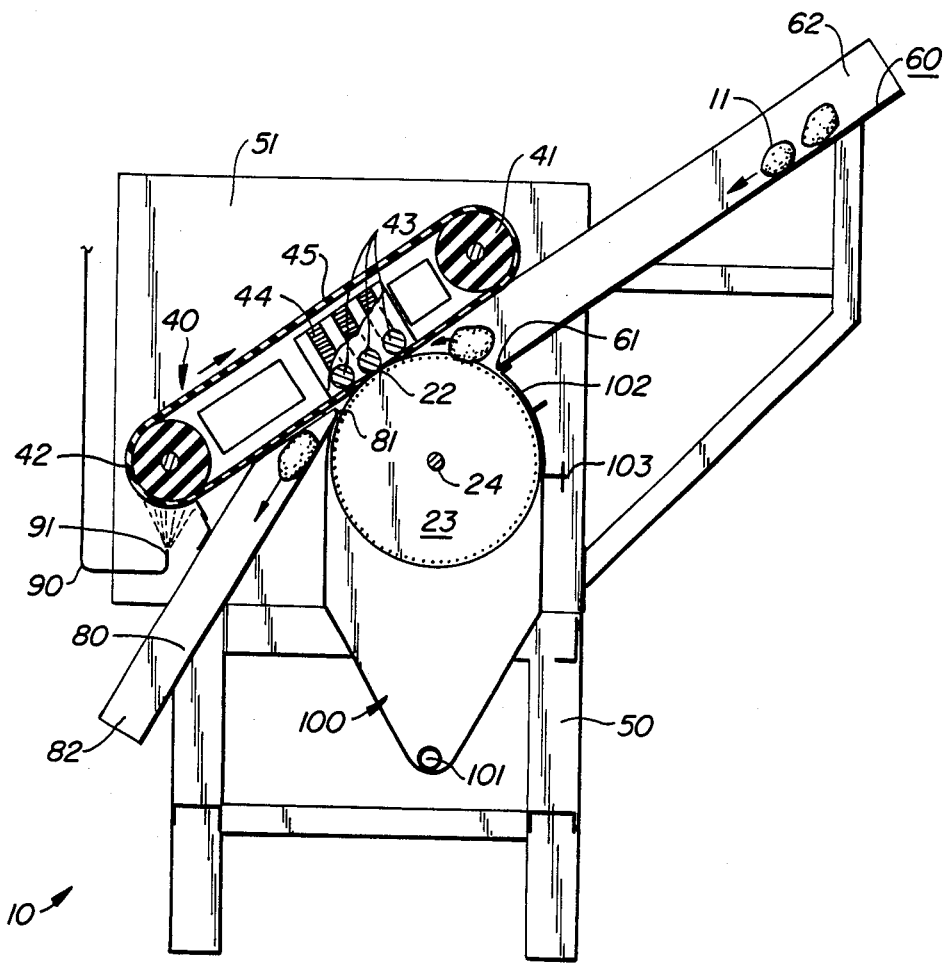
FIG. 2 is a side elevation view of the papaya scraper sectioned perpendicular to the drum for illustration's sake.

Referring to FIGS. 1 and 2 the papaya scraper 10 comprises a drum 20, a conveyor belt assembly 40, a feed plate 60, a discharge plate 80 and a puree collection hopper 100. The scraper is supported on a stand 50. The sliced papaya 11 is placed flesh side down on feed plate 60, and slides by gravity down to conveyor 40, which comprises supply axle 41 at its upper end, take-up axle 42 at its lower end, and belt 45 around the axles. Belt 45 and axles 41 and 42 are preferably 63 centimeters wide. When wet, belt 45 must have a high enough coefficient of kinetic friction against papaya skin to withstand the shear force of the rods 21 moving through the papaya pulp. Corrugated rubber and floor-mat rubber are suitable for belt 45. The papaya 11, prevented by side walls 62 from falling off the sides of plate 60, slides off the lower edge 61 of the plate onto scraper drum 20. The larger pieces fall with, and the smaller pieces without, the urging of belt 45. Scraper drum 20 comprises an axle 24, preferably at least 63 centimeters wide, and, mounted on axle 24, two end disks 23 preferably having radii of 20.6 cm. Disks 23 each have a circle of holes near their periphery, anchoring scraping rods 21. Round stainless steel rods 21 are used in the preferred embodiment, although variations of the shape and materials are possible.

Figure 3:
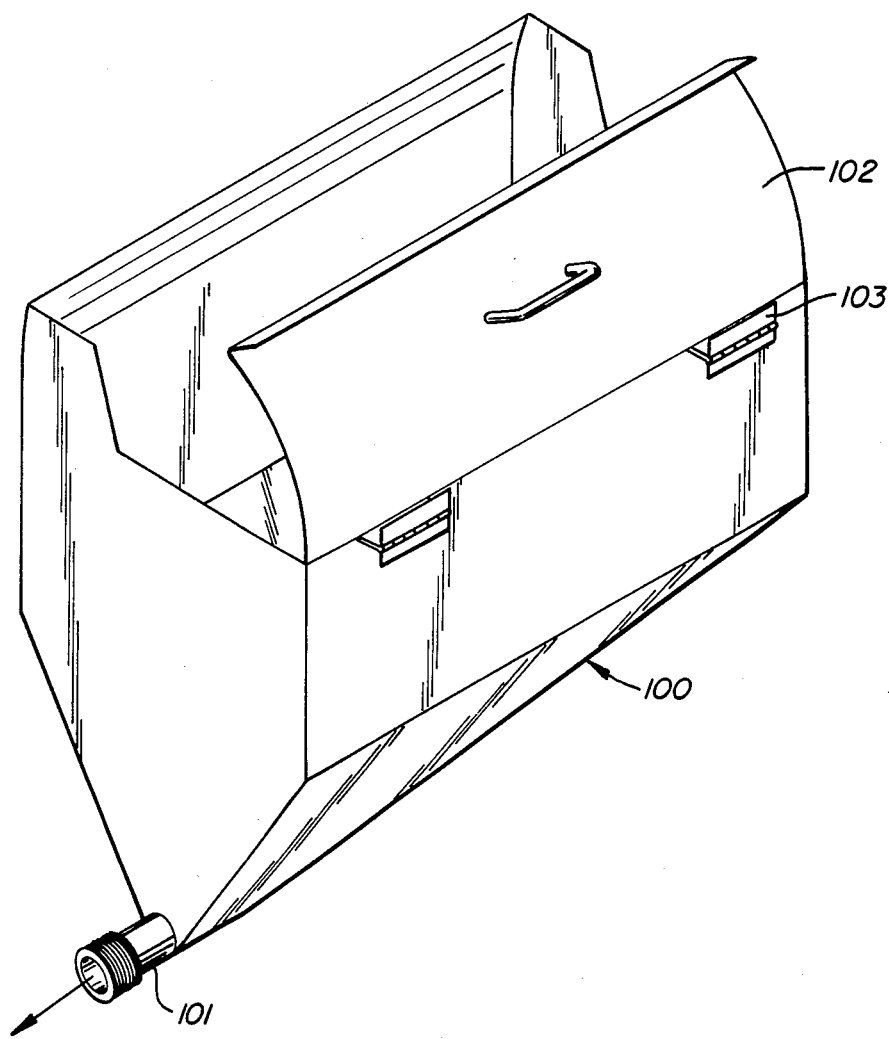
FIG. 3 is a perspective of the pulp and seed collection hopper removed for illustration's sake from beneath the drum.

The papaya falls off the end 61 of plate 60 into a space between rods 21 and belt 45 which is larger than the usual thickness of a papaya slice 11. The papaya is pulled by drum 20 onto belt 45, which, though moving in the same downward direction as rods 21, is moving less swiftly and holds the papaya skin back. In the preferred embodiment the tangential speed of drum 20 is 4.3 meters per second (9.65 mph) which is four times the linear speed of belt 45. The conveyor belt axles and the drum axle 24 are supported by end plates 51 and 52, and driven by conventional motors and reduction gears, not shown. As papaya slice 11 approaches the rod 22 momentarily closest to the belt 45, the face of the papaya is scraped off. The distance between belt 45 and rod 22 should be 0.15 to 0.25 inches, or somewhat greater than the 0.06 inch typical maximum thickness of a papaya skin. Springs 44 hold cylindrical bars 43, parallel to axles 41 and 42, behind the face of belt 45 to maintain the papaya at a fairly constant pressure against rods 21. The scraped out pulp, seeds and juice fall through the rotating rods and drum, to be collected by hopper 100. The hopper, shown separately in FIG. 3, extends around the lower part of the scraper inside stand 50 and between the feed plate edge 61 and discharge plate edge 81. The pulp and seeds are removed from hopper 100 by tap 101 to a finisher, not shown, for separation. In the finisher, paddles force the pulp and juice, but not the seeds, through a screen. Hopper 100 also has a hinge 103 holding a door 102 which may be opened for cleaning. Friction between belt 45 and the papaya skins carries them over the parallel edge 81 of discharge plate 80. Plate 80, which is not found in the prior art, prevents the pieces of peel, which exude latex, from falling into the hopper and, while awaiting separation, giving the puree a bitter taste. The skins are channeled by side walls 82 and slide off to be disposed of.

A rinsing system including a pressurized water supply, a pipe 90 and water sprayers 91 is preferably provided to keep papaya juice from accumulating and drying on belt 45, and making the belt dirty and sticky. The spray also dislodges any skins sticking to the belt.

With the drum rotating at 200 rpm single papaya slices can be processed in two seconds, and slices can be placed on the feed plate end-to-end or even side-by-side, depending on the width of drum 20 and belt 45.

A preferred embodiment has been illustrated in detail, modifications and adaptations of which will occur to those skilled in the art. Such modifications and adaptations are within the spirit and scope of the present invention, as limited only by the following claims.

We claim:

1. Apparatus for peeling papaya, said apparatus comprising:

scraper means comprising a rotatable drum defined by a plurality of parallel straight rods interconnected equi-distant from a substantially horizontal axis;

conveyor means comprising a supply axle at a higher elevation than said drum, a take-up axle, and a conveyor belt disposed around said axles, said axles being disposed parallel to said rods, being spaced apart at relative heights to provide a conveyor belt path including an inclined path portion radially spaced from said drum with a closest approach at a position past top dead center of said drum, and being rotatable to move said conveyor belt downwardly along said inclined path portion;

feed means comprising a first slide plate above said drum, having a planar area inclined downwardly to a first edge below and parallel to said supply axle, said first edge being at a position before top dead center of said drum;

pulp collecting means disposed beneath said drum;

discharge means comprising a second slide plate having a planar area inclined downwardly from a second edge below and parallel to the closest approach of said rods to said conveyor belt, said second edge being at a position past top dead center of said drum; and drive means for effecting rotation of said drum and said supply and take-up axles in the same angular sense such that at any instant the velocity of the rod closest to said conveyor belt is in the same direction as and greater than the velocity of said conveyor belt;

said drum, said conveyor belt, said first and second slide plates, and said pulp collecting means being relatively disposed so that papaya slices placed on said first slide plate move spontaneously downwardly, are biased against said drum by said conveyor belt, and have their pulp and seeds separated from their skins, whereupon the pulp and seeds are collected by said pulp collecting means and the skins are directed away from said pulp collecting means by said second slide plate.

2. Apparatus as in claim 1 wherein said pulp collecting means comprises a pulp, juice and seed collection hopper disposed under said drum and having wall portions extending up to said first and second slide plate edges.

3. Apparatus as in claim 1 wherein said drum also comprises a drum axle and two end disks connecting said rods to said drum axle.

4. Apparatus as in claim 1 further including a pressurized water supply, pipe, and spray nozzle to spray water on said conveyor belt.

5. Apparatus as in claim 1 wherein said belt has a rubber surface and said rods are stainless steel.

6. Apparatus as in claim 1 wherein said slide plates each have upwardly extending walls along their edges to prevent fruit which is being fed into and discharged from said apparatus from falling off the sides of said slide plates.

7. Apparatus as in claim 1 wherein said drum and said supply and take-up axles are rotated so that at any instant the velocity of the rod closest to said conveyor belt is about four times the velocity of said conveyor belt.

8. Apparatus as in claim 1 further comprising finisher means for separating seeds from the pulp as collected by said pulp collecting means.

9. The invention of claim 1, wherein said conveyor means further comprises:

a plurality of cylindrical bars disposed parallel to said supply and take-up axles, said bars contacting said conveyor belt along said inclined path portion; and means for resiliently urging said bars against said conveyor belt in a direction toward said drum.

* * * * *